US010483775B1

(12) United States Patent
LaBerteaux

(10) Patent No.: US 10,483,775 B1
(45) Date of Patent: Nov. 19, 2019

(54) PRIVACY CHARGING STATION FOR ELECTRONIC DEVICES

(71) Applicant: Emily Louise Hildreth LaBerteaux, Stamford, CT (US)

(72) Inventor: Emily Louise Hildreth LaBerteaux, Stamford, CT (US)

( * ) Notice: Subject to any disclaimer, the term of this patent is extended or adjusted under 35 U.S.C. 154(b) by 0 days.

(21) Appl. No.: 15/915,059

(22) Filed: Mar. 7, 2018

Related U.S. Application Data

(60) Provisional application No. 62/468,343, filed on Mar. 7, 2017.

(51) Int. Cl.
*H01M 10/46* (2006.01)
*H02J 7/00* (2006.01)
*G10K 11/175* (2006.01)
*G02B 5/08* (2006.01)

(52) U.S. Cl.
CPC ............ *H02J 7/0044* (2013.01); *G02B 5/08* (2013.01); *G10K 11/175* (2013.01); *H02J 7/0027* (2013.01)

(58) Field of Classification Search
CPC ................................ H02J 7/355; H02J 7/0042
USPC ......................................... 320/107, 114, 115
See application file for complete search history.

(56) References Cited

U.S. PATENT DOCUMENTS

2016/0234356 A1* 8/2016 Thomas ............... H05K 9/0069

* cited by examiner

*Primary Examiner* — Edward Tso
(74) *Attorney, Agent, or Firm* — Jason LaBerteaux

(57) ABSTRACT

A charging station comprises a container configured to house at least one electrical device within an internal space within the container. At least one electrical outlet is disposed within the container, wherein the at least one electrical outlet is configured to provide power to the at least one electrical device. A noise generator is located in the internal space within the container, wherein the noise generator is configured to supply masking noise while the at least one electrical device is resident within the internal space.

4 Claims, 8 Drawing Sheets

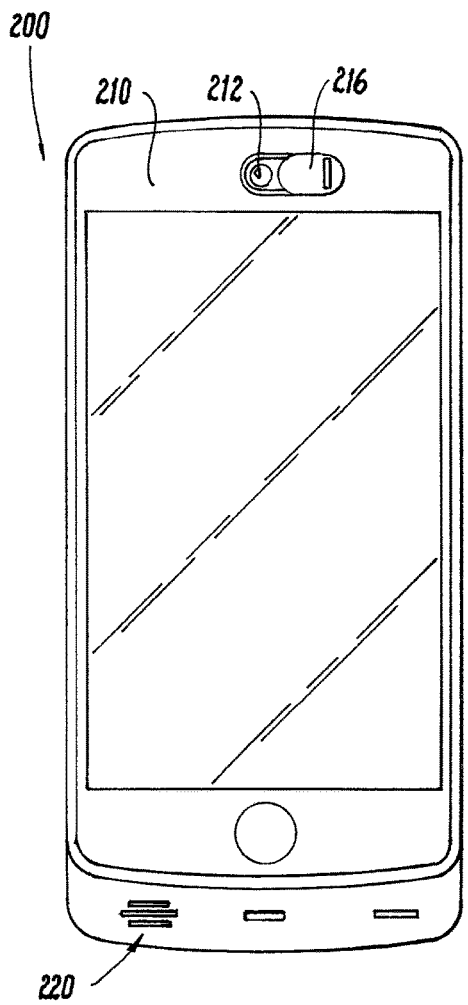
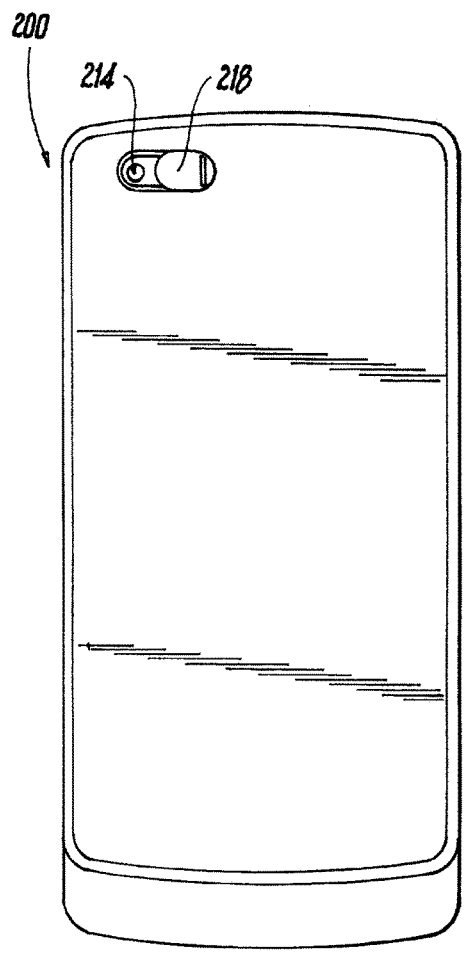
Fig. 6a
Fig. 6b
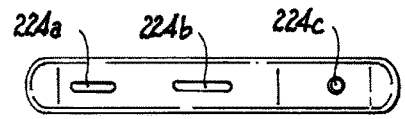
Fig. 6c
Fig. 6d

PRIVACY CHARGING STATION FOR ELECTRONIC DEVICES

FIELD OF THE INVENTION

The present invention relates to electronic devices, and more specifically to methods and systems for charging station for electronic devices.

BACKGROUND

Electronic devices, such as cellular phones, tablet computers, and portable gaming devices, typically include microphones and/or digital camera systems. These devices allow a user to speak with friends and family, conduct video chats, or the like. However, with access to a device through hacking or unintended connections, a third party is able to surreptitiously listen in or spy on a person through control of the electronic device.

Electronic devices such as those described above typically are battery operated and must be regularly recharged. Users typically select a charging area close at hand at home or at an office for ease of access to their electronic device. This close proximity to a user every day at all times further increases the desirability for a third party to eavesdrop on conversations or spy on a person by surreptitiously enabling the electronic device's microphone and/or camera. What is needed is a charging station which can render the ability to hear and/or view the surroundings of an electronic device in a convenient and helpful manner.

BRIEF DESCRIPTION OF THE DRAWINGS

The present invention is illustrated by way of example and not limitation in the figures of the accompanying drawings, in which:

FIGS. 6a-6d are plan views of an electronic device with an external privacy case in accordance with an embodiment of the invention, showing privacy elements;

DESCRIPTION

Figure 1:
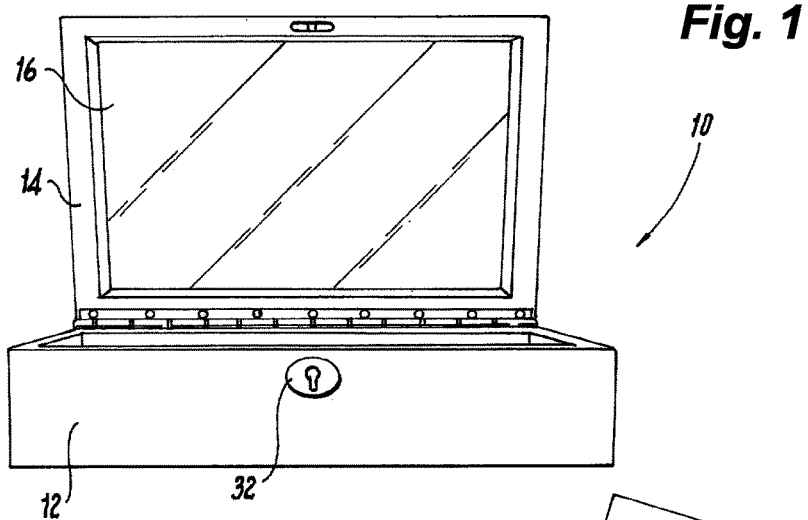
FIG. 1 illustrates a front view of a charging station with privacy elements in accordance with an embodiment of the invention.
Figure 2:
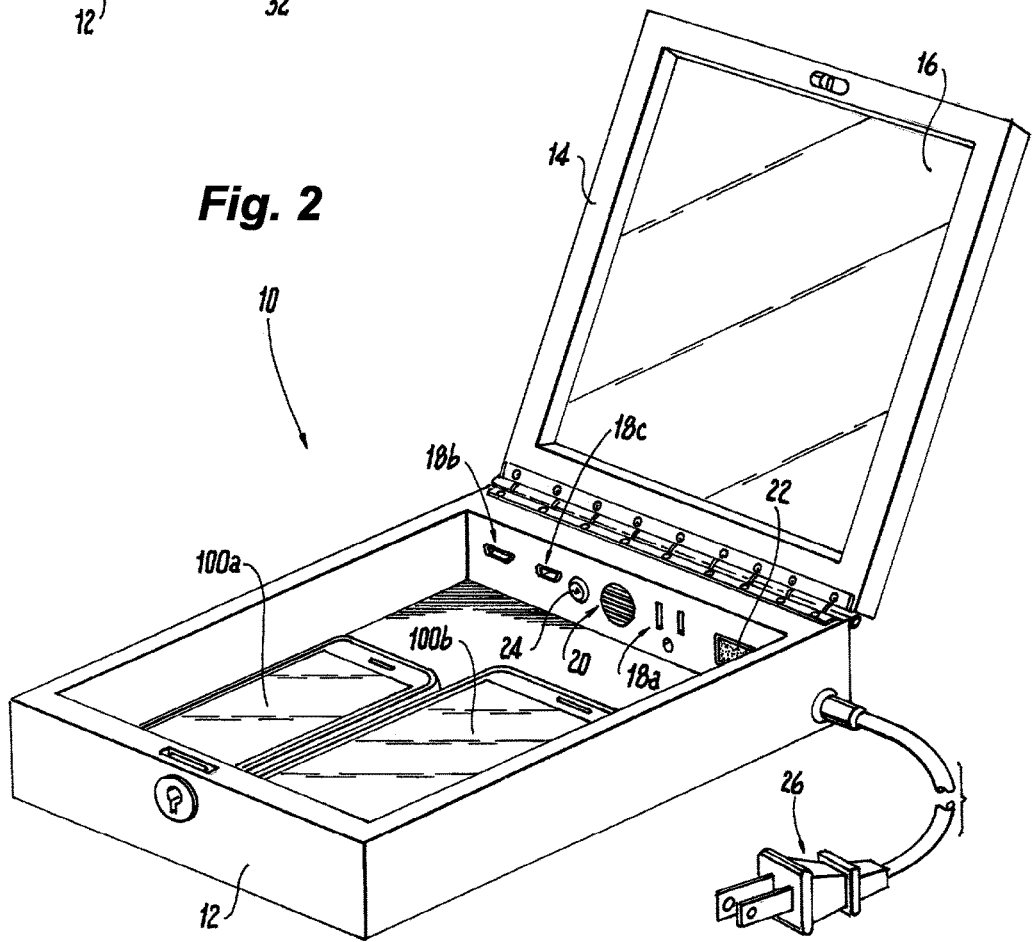
FIG. 2 is a top view of the charging station of FIG. 1, showing electronic devices located within the station.

Referring to FIGS. 1 and 2, electronic device charging station 10 configured in accordance with an embodiment of the present invention is constructed as a box shape, using wood or other such suitable material as desired. Preferably, a substantially solid material such as wood, plexiglass, or combination of material is used for construction of walls 12 of charging station 10 in order to reduce external noise intrusion. The internal area of walls can be lined with a sound dampening material to further reduce external sound intrusion.

In an exemplary embodiment, electrical outlets 18a-18c are provided in the internal area of charging station 10. Electrical outlets 18a-18c can be any number of electrical supply ports for charging electrical devices, such as standard A/C electrical plug 18a, USB ports 18b, 18c, DC plug, or the like. Further, any number or combination of desirable electrical outlets 18a-18c can be provided in the internal area of charging station, depending on the number of devices intended to be connected to a charging voltage, and the overall size of charging station 10.

Lid 14 is utilized for access to the internal area of charging station 10. In one embodiment, window 16 is provided to allow viewing access to the internal area of charging station 10 for checking the status of electronic devices 100a, 100b without the need to open lid 14. In another embodiment, window 16 can be constructed with a one-way mirror film attached to window 16 to allow viewing of the internal area of charging station 10 by a user while preventing electronic devices 100a, 100b to be able to view any external image through window 16 to charging station 10 while lid 14 is in a closed position. In another exemplary embodiment, lid 14 can be constructed as a solid structure with no window 16 for increased privacy by completely restricting the view of electronic devices 100a, 100b.

In another exemplary embodiment, the internal area of charging station 10 is accessible by a drawer opening along the front face of charging station 10 instead of being accessibly by lid 14. This alternate structure would allow for opening the drawer to insert electrical devices 110a, 110b, connect them to the charging strip, and close the drawer to secure the electronic devices 110a, 110b within charging station 10.

In an exemplary embodiment, white noise generator 20 is located in the internal area of charging station 10 along wall 12. White noise generator provides a cover noise to muffle any conversations which could otherwise be heard by a microphone from any one of electronic devices 100a, 100b. In one embodiment, white noise generator 20 can be activated only when lid 14 is in a closed position, or it can be operable by a power switch 22 for user controlled operation. In another exemplary embodiment, white noise generator 20 can activate automatically upon detection of an electrical device 100a, 100b being plugged into an outlet. Further, a visual indicator 24, such as an LED light, is present to give a visual notification to a user that white noise generator 20 is in operation without the need to open lid 14. In other exemplary embodiments, white noise generator 20 can alternatively be a pink noise generator, chirps, active noise cancellation, a combination of sounds, or the like. In an exemplary embodiment, the volume of white noise generator 20 can be adjusted based on the sound level of detected external sound with a feedback driven volume control or by a volume control knob for user control. The feedback driven control can adjust the volume output of white noise generator 20 based on ambient noise intrusion, or some other monitored level as would be understood in the art. Alternatively, a predetermined volume level would be set and no control of the volume of white noise generator 20 would be available.

Power cord 26 provides a link to an external power source to supply electrical power to both electrical outlets 18a-18c and white noise generator 20 of charging station 10. In another exemplary embodiment, charging station 10 can also be supplied with an integrated battery power source (not shown) to allow for portable charging of electronic devices 110a, 110b and privacy protection. Further, an integrated battery power source can be configured to supply power to white noise generator 20 even if power is temporarily cut off from power cord 22 to continue to provide privacy protection. Lock 32 provides a way to securely close charging station 10 based on user preference. Lock 32 is shown as a traditional lock and key, but may be alternately designed with an electronic lock that can be unlocked via RFID tag, a minimum lock time or other such means known in the art. An electronic lock can provide additional user benefits, such as restricting access to electronic devices 110a, 110b by children at night or during study time.

Figure 3:
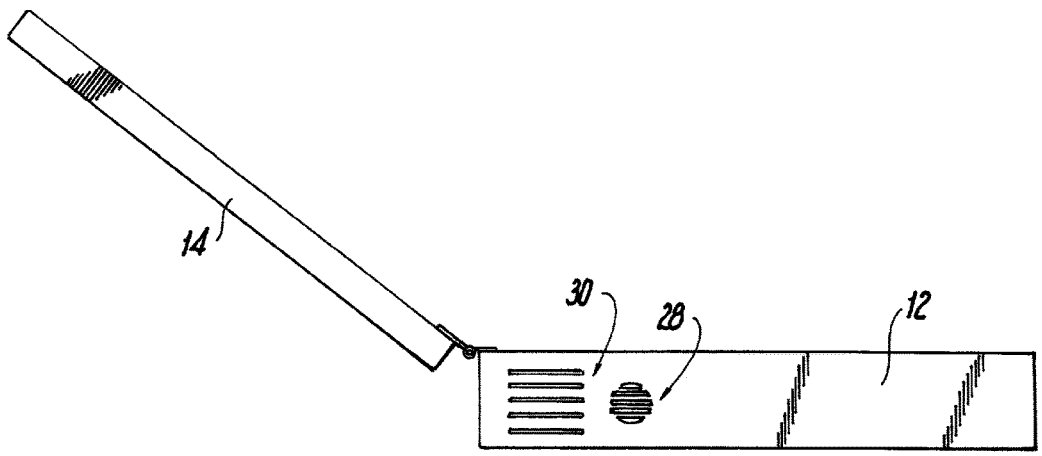
FIG. 3 is a side view of the charging station of FIG. 1, showing speaker and vent locations.

Referring to FIG. 3, in an exemplary embodiment, speaker 28 is attached on an external wall 12 of charging station 10. Speaker 28 is controlled by an internal circuit that detects one or more sounds broadcast from the electronic devices 110a, 110b. When a sound is detected, a notification tone, or other such notification sound can be broadcast from speaker 28 to provide an external notification to a user that one of the electronic devices 110a, 110b have made a sound, such as for an incoming call or text. Speaker 28 can be incorporated either internal or external to charging station 10 to supplement the notification to a user that either a call or other such notification is coming from an electrical device 100a, 100b located in the internal area of charging station 10. Alternatively, a visual indicator (not shown), such as an LED light, located either internal or external on charging station 10 could illuminate to indicate that a sound was detected in the internal area of charging station 10 could be present to reduce the need for accessing electronic devices 110a, 110b to check for missed calls or other such notifications. Further, vent 30 may be optionally present to provide airflow to the internal area of charging station 10 for heat dissipation or the like.

Figure 4:
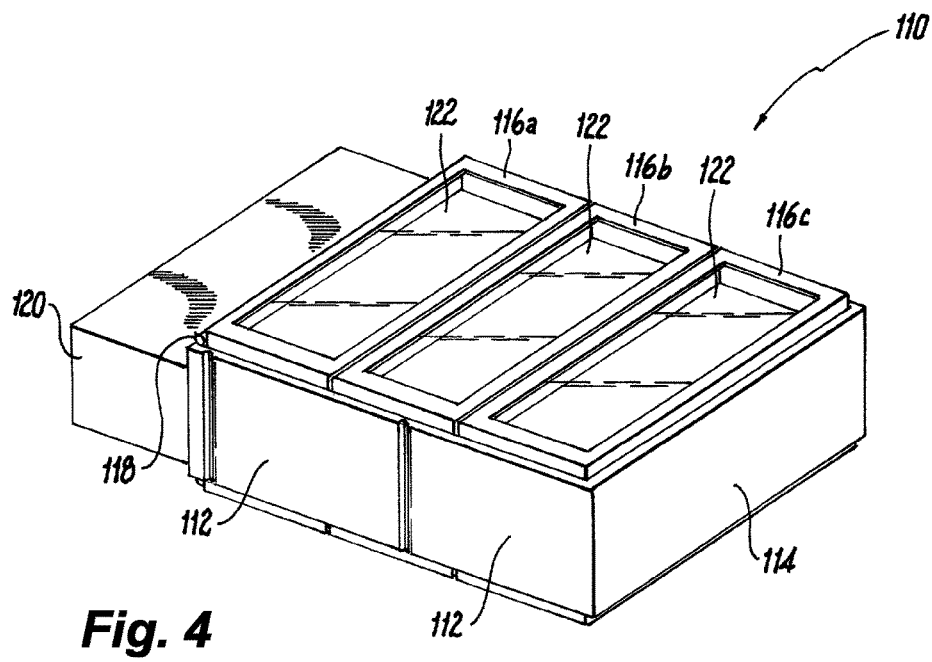
FIG. 4 is a perspective view of a collapsible charging station in accordance with an embodiment of the invention, showing the charging station in an extended and closed position.

Referring to FIG. 4, a collapsible charging station 110 in an extended position is shown. Side walls 112 are attached from charging base 120 in a hinged relationship with end wall 114. In this embodiment, charging base 120 includes electrical outlets 18a-18c and white noise generator 20 as described with reference to FIG. 2 above. The top and bottom of charging station 110 is composed of three wall slats 116a-116c which are attached by hinges along each edge and are held in place by retaining means along the perimeter formed by side walls 112 and end wall 114. Wall slats 116a-116c can optionally include a see-through window 122 constructed of plexiglass, plastic, glass, or the like, to allow for viewing the internal area of charging station 110. Window 122 can also be constructed with a one-way mirror finish to allow for viewing the internal area of charging station 110 by a user while inhibiting the view from the internal area to an external view. Hinge 118 attaches wall slat 116a to charging base 120. In the extended position, wall slats 116a-116c can be opened to allow internal access to charging station 110 for positioning electronic devices 110a, 110b as shown and described in FIGS. 1-3.

Power to charging station 110 can be provided by a power cord and may optionally include an integrated battery located within charging base 120 to further enhance the portability of charging station 110.

Figure 4A:
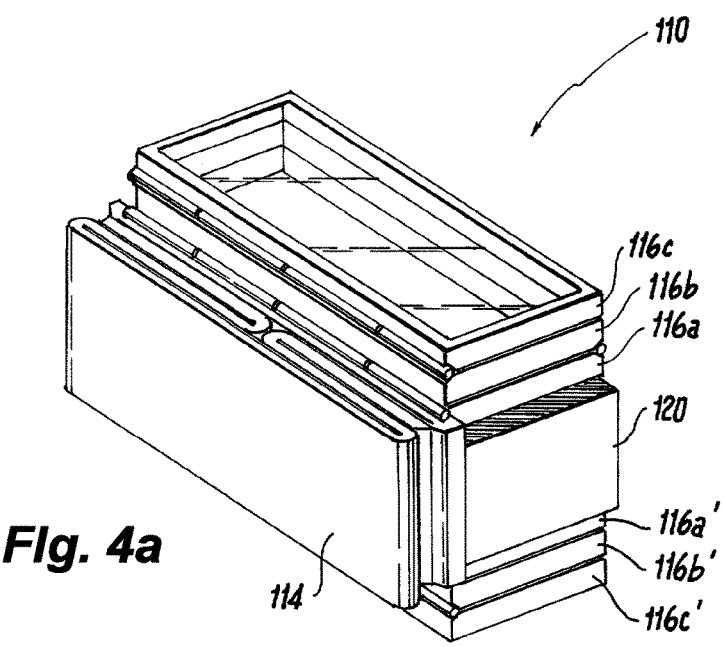
FIGS. 4a-4d are side, top, and back view of the charging station of FIG. 4, showing the charging station in closed, intermediate, and extended positions.
Figure 4B:
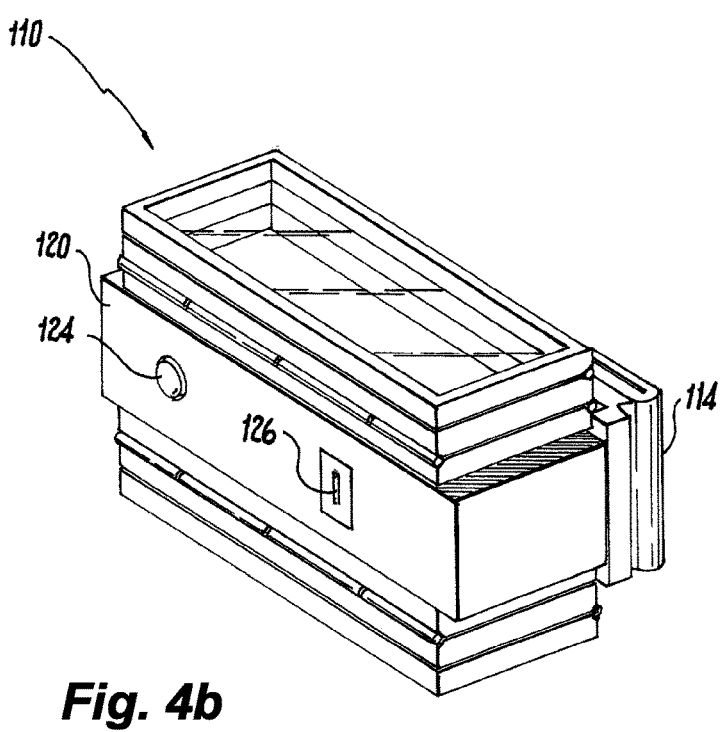
Figure 5A:
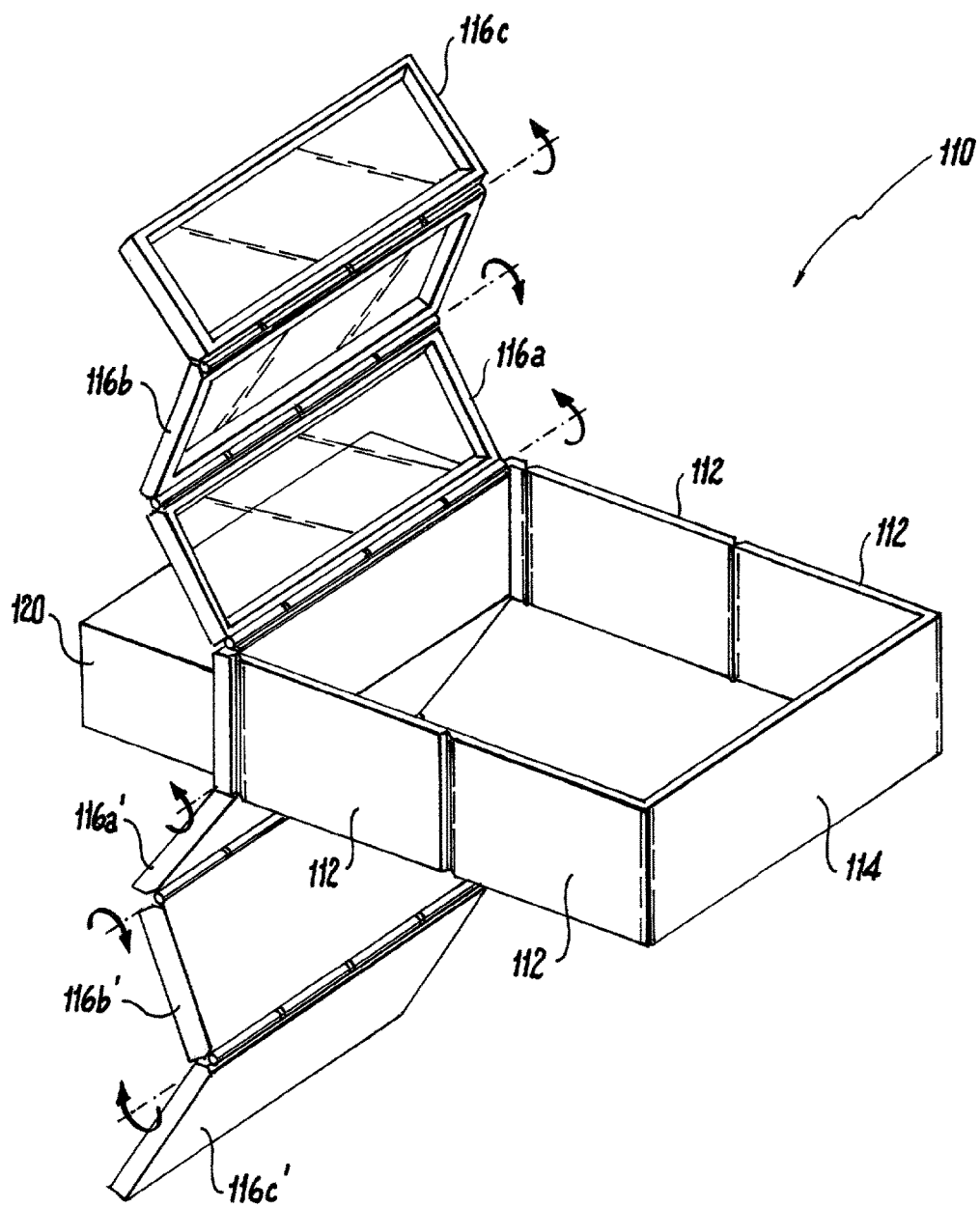
FIGS. 5a-5 are side views of the charging station of FIG. 4, showing the station in an intermediate and collapsed position
Figure 5B:
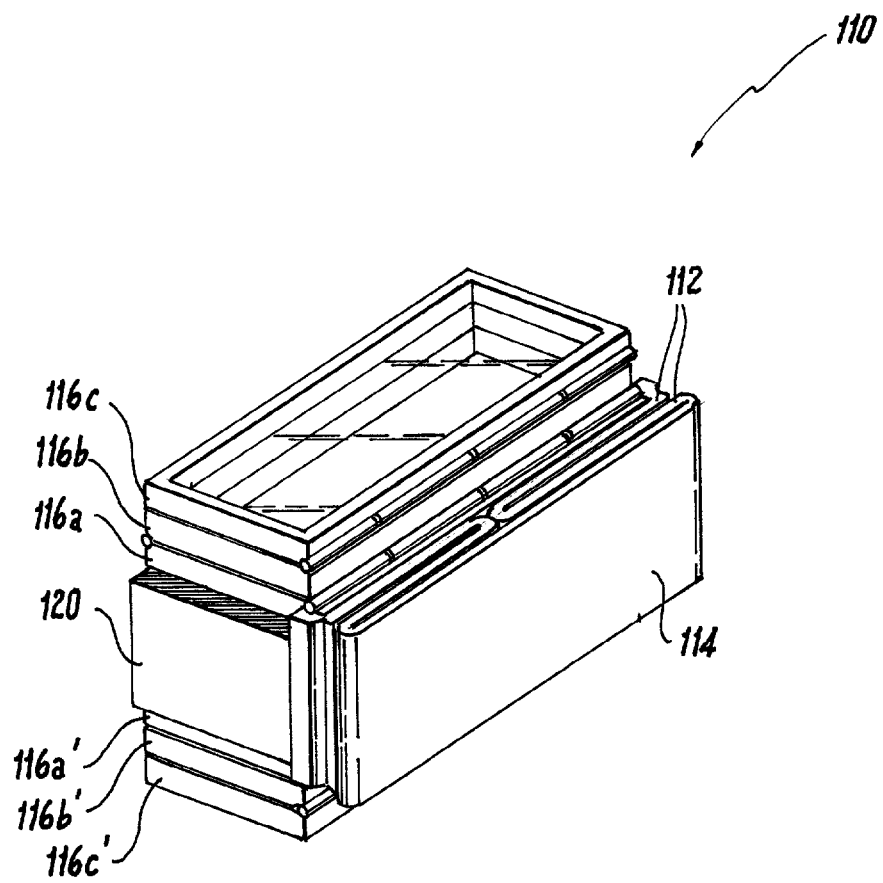

Referring to FIGS. 4a and 5b, charging station 110 is shown in a collapsed position. upper and lower wall slats 116a-116c and 116a'-116c' nest along the top and bottom of charging base 120 while end wall 114 is positioned along the internal wall face of charging base 120. On the back of charging base 120, FIG. 4b shows the back of charging base 120 which includes an external power switch 124 to control white noise generator 20 (not shown) while charging station 110 is in an extended position. Charging port 126 is also located on the back of charging base 120 to provide a means to connect power to charging base 120.

Figure 4C:
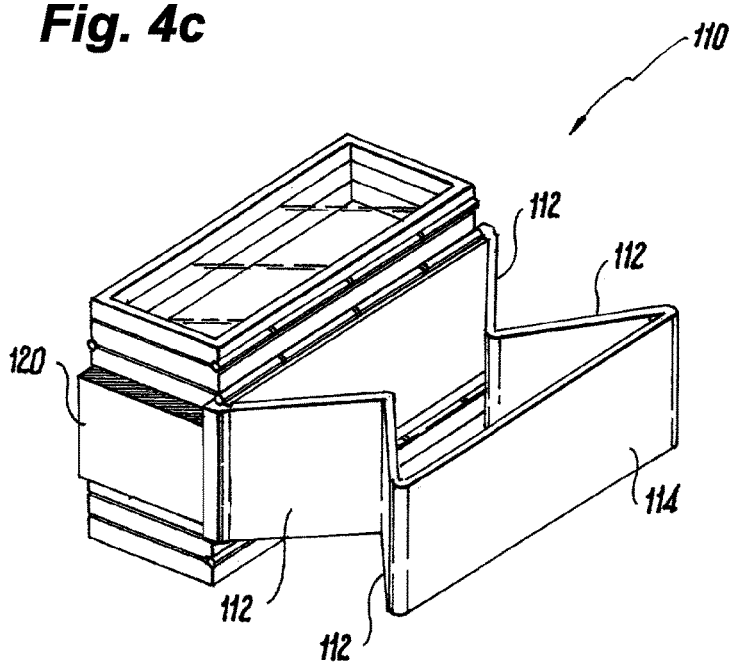
Figure 4D:
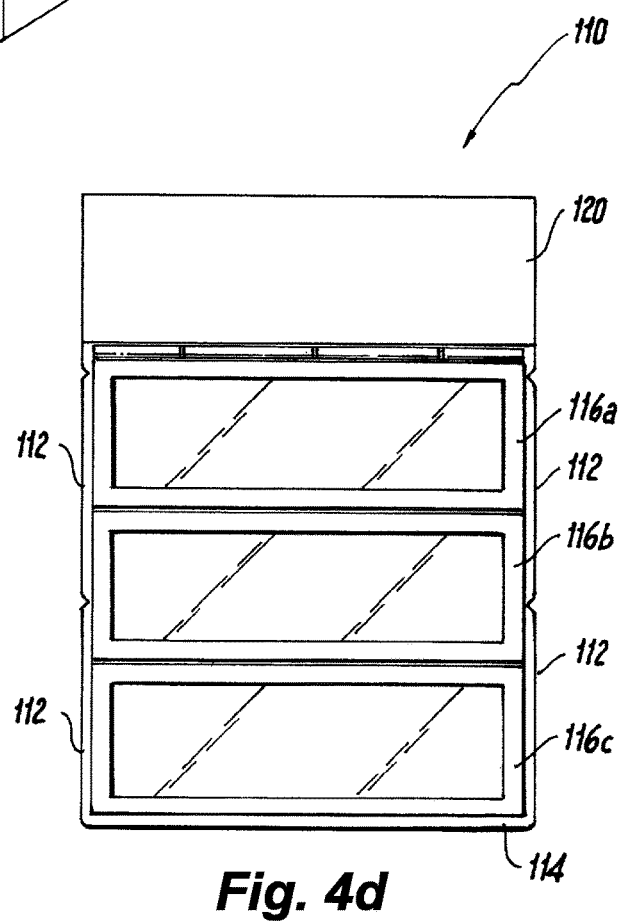

Referring to FIG. 4c, when a user is ready to use charging station 110, end wall 114 is pulled away from charging base 120. Side walls 112 connect charging base 120 to end wall 114. Once fully extended, FIG. 4d shows wall slats 116a-116c extended out over the top of the edge of side walls 112 and end wall 114 to form a top lid for charging station 110.

Referring to FIG. 5a, after end wall 114 is extended out, upper and lower wall slats 116a-116c and 116a'-116c' can be seen unfolding from a nested position along the upper and lower walls of charging base 120.

In accordance with another embodiment, FIGS. 6a-6d show electronic device 210 surrounded by privacy case 200. In an exemplary embodiment, electronic device 210 is a cellular phone with front camera 212 and rear camera 214. When privacy is desired, or when either camera is not in use, front shutter 216 and rear shutter 218 can be independently moved over the face of each respective camera 212, 214. When the shutters 216, 218 are moved over the face of their respective camera, the cameras 212, 214 are isolated and unable to view any images beyond the back face of the shutters 216, 218. This enhanced feature allows a user to be able to only allow images to be taken by electronic device 210 when the user desires along with a visual privacy indication when the shutters 216, 218 are closed.

Along the top of electronic device 210, privacy case 200 includes a power switch 222 to operate integrated white noise generator 220. When activated, white noise generator 220 masks any conversations or external noise which could otherwise be monitored by microphones incorporated into electronic device 210. On the bottom of privacy case 200, access ports 224a-224c allow the electronic device to have access to a charging port for the electronic device 210 and also microphone and/or speaker ports for normal operation. In another embodiment, a cover (not shown) can be moved over one or more of the ports 224a-224c to reduce the ability for electronic device 210 to pick up external noise while in a privacy mode.

Figure 7A:
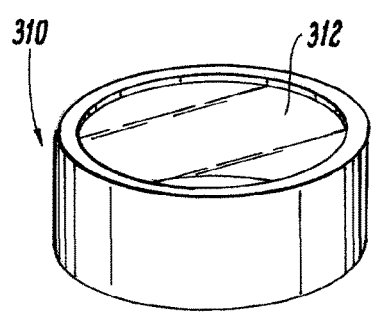
FIGS. 7a-7e show side views of a collapsible charging station in accordance with an embodiment of the invention showing a charging station in closed and extended positions.
Figure 7B:
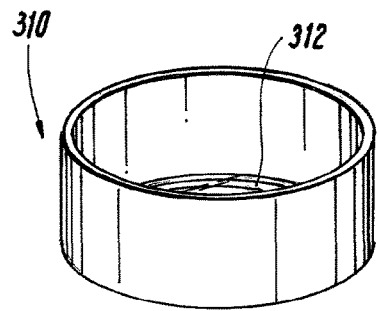
Figure 7C:
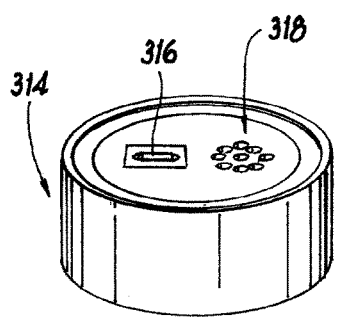
Figure 7D:
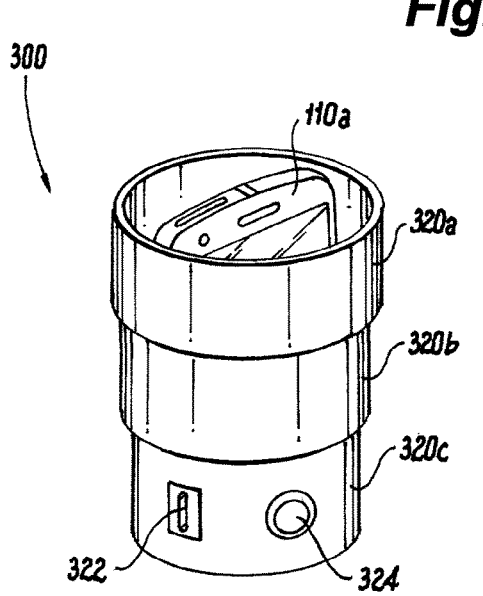
Figure 7E:
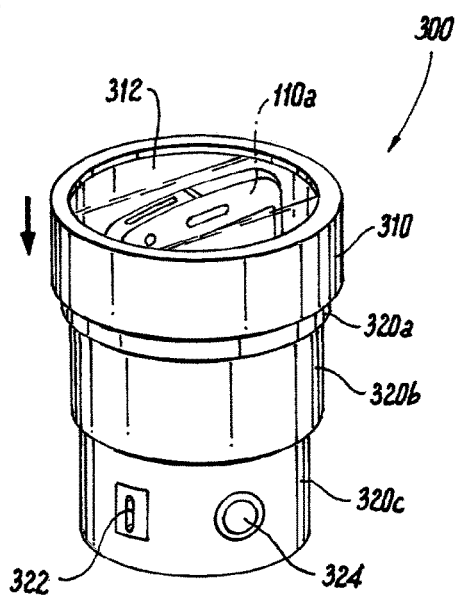

In another exemplary embodiment, charging station 300 is a collapsible circularly shaped holder for an electronic device 110a. FIGS. 7a and 7b show upper cap 310 with a clear window 312 for viewing the internal area of charging station 300. FIG. 7c shows charging base 314 with integrated electrical outlet 316 to supply power to electrical device 110a and white noise generator 318 to supply white noise to mask external noise. Charging base 314, in an exemplary embodiment, is constructed of three concentric nesting ring-shaped walls 320a-320c. When upper wall 320a is extended upward, a smaller radius on the lower portion of upper wall 320a engages with a larger radius of center wall 320b. Center wall 320b likewise engages with the upper portion of charging base 314 lower wall 320c to provide a cup shaped charging area for an electronic device 110a. Power port 322 provides a means for supply power internally to charging base 314 to electrical outlet 316 as well as white noise generator 318. Optionally, a battery (not shown) can be integrally supplied with charging base 314 to supply either power to the white noise generator 318 only or as a power supply for both electrical outlet 316 and white noise generator 318.

What is claimed is:

1. A charging station, comprising:
   a container configured to house at least one electrical device within an internal space within said container;
   at least one electrical outlet disposed within said container, said at least one electrical outlet configured to provide power to the at least one electrical device; and
   a noise generator located within said internal space within said container, wherein the noise generator is configured to supply masking noise while the at least one electrical device is resident within said internal space.

2. The charging station of claim 1, further comprising a window disposed along a wall of said container for viewing said internal space.

3. The charging station of claim 2, wherein said window is a one-way mirror with a partially transparent first side and a partially reflective second side.

4. The charging station of claim 1, wherein said container has a first collapsed position and a second extended position.

* * * * *